United States Patent [19]

Race

[11] 3,847,633

[45] Nov. 12, 1974

[54] BUILDING MATERIAL FOR MODULAR CONSTRUCTION

[75] Inventor: Andras Race, Chicago, Ill.

[73] Assignees: Robert L. Litvin, Chicago, Ill., Louis L. Marino, Chicago, Ill.; part interest to each

[22] Filed: Apr. 10, 1972

[21] Appl. No.: 242,802

[52] U.S. Cl............... 106/98, 106/99, 106/97, 106/DIG. 1, 106/DIG. 2
[51] Int. Cl................................................ C04b 7/02
[58] Field of Search.......... 106/97, 98, 99, DIG. 1–3

[56] References Cited
UNITED STATES PATENTS

| | | | |
|---|---|---|---|
| 1,610,203 | 12/1926 | Covell | 106/99 |
| 155,176 | 9/1874 | Bartlett | 106/99 |
| 164,850 | 6/1875 | Lyon | 106/99 |
| 3,232,778 | 2/1966 | Dean | 106/97 |

OTHER PUBLICATIONS

Lea, F. M., Chemistry of Cement and Concrete London, Arnold Publishers, 1956, p. 342.

Primary Examiner—Delbert E. Gantz
Assistant Examiner—James W. Hellwege
Attorney, Agent, or Firm—Norman Lettvin

[57] ABSTRACT

A lightweight building material having a density in the range of 26 pounds per cubic foot which is moldable so as to be useful in forming prefabricated interior wall panels and the like, to be assembled into a room at a construction site. The material is inorganic and includes lightweight aggregate, Portland cement and a property-enhancing mixture of vermiculite and sodium silicate.

2 Claims, No Drawings

BUILDING MATERIAL FOR MODULAR CONSTRUCTION

BACKGROUND OF THE INVENTION

This invention relates to building materials which can be preformed into panels and the like for assembly of interior walls and partitions at a construction site.

Proposals have been made to use panel-like members in modularized constructions which are to be assembled at the construction site to form rooms and partitions. The panels for use therein would be prefabricated to provide various structural and esthetic shapes which when assembled would provide a desired room or the like. In one particular arrangement bathrooms could be constructed from a plurality of prefabricated panels.

In order to meet various building codes the material from which the panels would be fabricated must be non-toxic, non-fuming and fire retardant when heated or exposed to flames. Furthermore, the material should be moldable, shape-sustaining and sufficiently lightweight (in the range of 26 pounds per cubic foot) to permit easy erection and assembly at the construction site. Moreover, these materials must be amenable to the standard cutting and fastening techniques as are standard in the trade.

Various moldable plastic materials are commercially available from which such panels could be made. These materials may provide the desired esthetic and structural characteristics as well as being capable of treatment like standard construction materials. However, when subjected to building code heat and flame tests the plastic materials will fume, emit dense smoke, expel toxic vapors and/or combust.

A totally inorganic moldable material which will pass the building code heat and flame tests is a lightweight perlite concrete, which is a mixture of Portland cement and expanded perlite. Perlite concrete is currently available and technical specifications are provided in a publication by the Perlite Institute, Inc., 45 West 45th Street, New York, New York 10063, Catalogue No. 30-1967, entitled "Perlite Lightweight Insulating Concrete." The materials disclosed therein have been used principally in thick (6 inch) panels for exterior construction and as insulating materials. Perlite concrete having a density in the desired range is available but has not been used in interior constructions in which thinner sections having greater strengths and improved fabrication characteristics are desirable.

It is therefore an object of this invention to provide a material, for use in panels that form interior wall constructions, which meet existing building code requirements, is adapted to be prefabricated and erected at a construction site and also possesses properties which permit standard on-site fabrication.

It is another object of this invention to provide a material which has increased strengths.

These and other objects will become apparent from the description hereinafter and the appended claims.

SUMMARY OF THE INVENTION

There is provided by virtue of this invention an inorganic material which is moldable to form prefabricated interior construction members which meet building code requirements as to fuming, smoke density, etc., and provide the needed strength levels and on-site fabrication characteristics. The material includes Portland cement and expanded perlite, as in the prior art lightweight concrete, and further includes plaster of paris and fly ash to enhance curing properties, and fiberglass strands to enhance the crack-resistance properties of the body. Vermiculite and a soluble silicate, such as sodium silicate, are also included and are believed to enhance the strength of the body by the formation of a strengthening network throughout the body.

DESCRIPTION OF THE PREFERRED EMBODIMENT

In one embodiment interior room panels or partitions could be molded in sheets of approximately 4 feet × 8 feet × 2 inches thick. In this size the sheet would weigh approximately 175 pounds and have a density in the range of 26 pounds per cubic foot (i.e., 26 pounds per cubic foot ± 10 percent). A sheet of this size could be readily installed at a construction site by two workmen who together could lift and place the panel. It will be appreciated that for economic reasons such panels could not be much heavier since they would be difficult to ship and could require more than two men for installation. When installed on the construction site these panels should be capable of fabrication in much the same manner as the standard gypsum wallboard, namely by cutting, drilling and the like.

When subjected to the tests set forth in the various building codes this material does not fume, expel noxious vapors or emit a dense smoke. This, in combination with its lightweight, molding, structural and fabrication characteristics can provide a material which is readily adapted to modularized construction.

This building material is made by preparing a castable blend of aggregate and binder materials and then treating said blend in accordance with a novel curing cycle so as to provide a molded body having enhanced properties. To achieve the desired density of about 26 pounds per cubic foot the raw materials are first dry-mixed so that the mixture is of said density and then blended with a suitable amount of water. The blended material is then cast or molded to the desired shape and then subjected to the curing cycle to dry the material to a controlled density, usually in the range of the dry density. In other words, the body is cured until a preselected density is obtained.

The raw materials from which the body of this invention is made include Type III Portland Cement as specified under ASTM Designation C 150. The cement can include between about 40 and 55 percent of the dry mix. If the cement is less than 40 percent the body may be too weak, and if over 55 percent may be too heavy. Forty two percent is the preferred amount of dry cement.

Perlite, which is a naturally occurring siliceous volcanic rock which has been expanded by heating to 1,600° F. is provided as a lightweight aggregate material. The perlite used herein may meet the requirements of ASTM Designation C-332. In one form of this invention two forms of expanded perlite can be used, namely a perlite having a density of 3 pounds per cubic foot and another having a density of 7-½ pounds per cubic foot. The total amount of both types of perlite may be between about 24–19 percent and in the preferred embodiment there is: 14 percent perlite having a density of 3 pounds per cubic foot and 10 percent perlite having a density of 7-½ pounds per cubic foot.

As an additional aggregate, fiberglass strands may be included in the body and these strands are generally less than 2 inches in length. In a preferred embodiment two forms of strands are used, namely strands having a length between 1–2 inches and a fine flock in which the strands are of a much shorter length. The total amount of fiberglass is in the range of 5 percent with there being about 3 percent fibers and 2 percent flock.

Fly ash, which is defined as the very fine ash produced by combustion of powdered coal with forced draft and which is carried off with the flue gases of such processes, is also mixed into the body. It is believed that the fly ash cooperates with the lime (CaO) in the Portland cement and enhances the curing of the body and retards crumbling of the surface. Fly ash may be present in amounts ranging between 11–7 percent, with 10 percent being preferred.

Plaster of paris (otherwise referred to as gypsum cement) which consists essentially of calcium sulphate and is produced by the complete or partial dehydration of gypsum ($CaSO_4 \cdot 2H_2O$) is also included in the body. The plaster of paris is believed to enhance the binding characteristics of the body. The preferred amount of plaster of paris is about 10 percent and acceptable bodies can be produced with plaster of paris in the range of 11–7 percent.

Vermiculite and a water soluble silicate are also included to enhance the strength of the body. It is believed that the combination of these materials after curing provides a glass-like network throughout the body which appears to increase the strength of the body as well as giving the body a smooth attractive surface.

Vermiculite is a hydrated magnesium-aluminum-iron silicate and is a mineral of the mica group. It contains approximately 39 percent $SiO_2$; 21 percent $MgO$; 15 percent $Al_2O_3$; 9 percent $Fe_2O_3$; 5.7 percent $K_2O$; 1 percent $CaO$ and 5.9 percent $H_2O$. When vermiculite is heated to about 2000° F. it expands in a manner similar to perlite to provide an expanded lightweight material.

The water soluble silicate is preferably a sodium silicate, commonly referred to as water glass, which contains $Na_2O$ and $SiO_2$ in ratios between 1:3.75 to 2:1. Other soluble silicates are available but sodium silicate is preferred. One such sodium silicate may be purchased under the trade name CAB-O-SIL, from the Cabot Corp., 125 High Street, Boston, Massachusetts.

In the preferred embodiment there is included 3 percent sodium silicate and 6 percent vermiculite which includes 2 percent fine ground vermiculite and 4 percent vermiculite having a density of 7 pounds per cubic foot. The lower limit of total vermiculite may be about 4 percent.

The dry mix is prepared from these materials and water is then blended into the mix in amounts sufficient to provide a moldable slurry. The molded slurry is then cured so as to produce a body having the desired density. Generally, a first slow, low temperature curing stage is used to avoid an undesirable reaction which is then followed by a final higher temperature short-time cure.

In one specific example the following materials were dry mixed:

| | | |
|---|---|---|
| 4.2 | pounds | Type III Cement |
| 1.0 | do. | Fly Ash |
| 0.2 | do. | Fine Ground Vermiculite |
| 0.4 | do. | Vermiculite 7 pounds per cubic foot |
| 1.4 | do. | Perlite 3 pounds per cubic foot |
| 1.0 | do. | Perlite 7½ pounds per cubic foot |
| 0.2 | do. | Fine Fiberglass |
| 0.3 | do. | Fiberglass fibers (1–2 inches) |
| 0.3 | do. | Sodium Silicate |
| 1.0 | do. | Plaster of Paris |

To this mixture 3 pounds of water, or 30 percent by weight of the dry mix, was blended with the dry mix. This blend was then cast into a body for curing. With the body still in the mold it was subjected to a two-stage cure in which forced air less than 100° F. was directed over the mold for 3 days. After three days the body in the mold was oven-cured at 360° F. until a density of 26 pounds per cubic foot was attained. The final density is equivalent to the density of the dry mix products.

This body was then subjected to heating and mechanical tests and found to exhibit characteristics and properties suitable for use as a building material.

It will be appreciated that numerous changes and modifications can be made to the embodiment disclosed herein without departing from the spirit and scope of this invention.

What is claimed and desired to be secured by the Letters Patent of the United States is:

1. An improved building material which is moldable to provide members adapted for assembly at a construction site and includes portland cement and lightweight perlite aggregate wherein the improvement comprises said material: being inorganic; further including vermiculite, soluble sodium silicate, plaster of paris, fly ash, and short strands of fiberglass; consisting essentially, in weight percent of: between about 40-55% portland cement, between about 11-7 percent plaster of paris, between about 11-7% fly ash, between about 6-4 percent vermiculite, between about 24-19 percent perlite, about 5 percent fiberglass, and about 3 percent sodium silicate; and being characterized as: non-toxic non-fuming and fire-retardant when heated or exposed to flames, having a density in the range of 26 pounds per cubic foot, being moldable to shapes including interior wall panels, and adapted for on-site fabrication.

2. A material as in claim 1 which consists essentially of: about 42 percent type III cement; about 10 percent plaster of paris; about 10 percent fly ash; about 2 percent fine ground vermiculite and about 4 percent vermiculite having a density of 7 pounds per cubic foot; about 14 percent expanded perlite having a density of 3 pounds per cubic foot; about 10 percent expanded perlite having a density of 7-½ pounds per cubic foot; about 3 percent fiberglass strands having a length between 1–2 inches; about 2 percent fiberglass strands having a length less than 1 inch; and about 3 percent sodium silicate.

* * * * *